United States Patent
Shenaq et al.

(10) Patent No.: US 9,302,645 B1
(45) Date of Patent: Apr. 5, 2016

(54) INTEGRATED SLIDE ADJUSTABLE PIVOTING SEAT BELT WEBBING GUIDE

(71) Applicant: FORD GLOBAL TECHNOLOGIES, LLC, Dearborn, MI (US)

(72) Inventors: Mohammed Shenaq, Wayne, MI (US); Sean Bayle West, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/611,329

(22) Filed: Feb. 2, 2015

(51) Int. Cl.
| | |
|---|---|
| *B60R 22/00* | (2006.01) |
| *B60R 22/20* | (2006.01) |
| *B60R 22/26* | (2006.01) |
| B60R 22/18 | (2006.01) |
| B60N 2/68 | (2006.01) |
| B60N 2/28 | (2006.01) |

(52) U.S. Cl.
CPC ............ *B60R 22/20* (2013.01); *B60R 22/26* (2013.01); *B60N 2/2803* (2013.01); *B60N 2/688* (2013.01); *B60R 22/201* (2013.01); *B60R 2022/1818* (2013.01); *B60R 2022/1837* (2013.01); *B60R 2022/207* (2013.01); *Y10T 24/40* (2015.01); *Y10T 24/407* (2015.01); *Y10T 24/4016* (2015.01); *Y10T 24/4072* (2015.01)

(58) Field of Classification Search
CPC ...... B60R 22/19; B60R 22/201; B60R 22/26; B60R 2022/1818; B60R 2022/206; B60N 2/688; B60N 2/2803; Y10T 24/4016; Y10T 24/40; Y10T 24/4072; Y10T 24/407
USPC ............ 297/486, 468, 464, 483, 471, 473, 297/250.1; 280/733, 801.1, 730.2, 808, 280/748, 801.2; 24/170, 171, 181, 191
See application file for complete search history.

(56) References Cited

U.S. PATENT DOCUMENTS

| | | | | |
|---|---|---|---|---|
| 3,844,001 | A * | 10/1974 | Holmberg | A44B 11/2538 24/598.1 |
| 4,893,835 | A * | 1/1990 | Linden | B60R 22/105 280/808 |
| 5,366,244 | A * | 11/1994 | Lane, Jr. | B60R 22/203 280/801.2 |
| 5,556,171 | A | 9/1996 | Busch | |
| 5,658,051 | A | 8/1997 | Vega et al. | |
| 5,743,597 | A | 4/1998 | Jessup et al. | |
| 6,669,302 | B2 * | 12/2003 | Warner, Jr. | B60N 2/2803 297/250.1 |
| 7,004,547 | B1 * | 2/2006 | Cheng | B60R 22/19 24/170 |
| 7,584,990 | B2 * | 9/2009 | Suyama | B60R 21/207 280/730.2 |
| 7,703,806 | B2 | 4/2010 | Bell et al. | |
| 7,740,271 | B2 | 6/2010 | Nezaki et al. | |
| 2002/0167213 | A1 * | 11/2002 | Warner, Jr. | B60N 2/2803 297/483 |
| 2007/0069510 | A1 * | 3/2007 | Suyama | B60R 21/207 280/733 |
| 2014/0312677 | A1 | 10/2014 | Bostrom et al. | |

* cited by examiner

*Primary Examiner* — Chi Q Nguyen
(74) *Attorney, Agent, or Firm* — Vichit Chea; King & Schickli, PLLC

(57) ABSTRACT

A seat belt guide assembly for a vehicle includes a webbing guide defining a slot for slidably receiving a seat belt web, a pivot mounted to the webbing guide, and a track configured to slidably receive the pivot and provide a path of travel for the webbing guide. A resilient member may be disposed within the track for biasing the pivot. The webbing guide includes a bottom and a cover together defining the slot, the cover being hingedly connected to the bottom at a first end and having a releasable closure disposed at an opposed end. The pivot may be defined by a stem attached to the webbing guide and a head attached to the stem. Configurations of the head provide a rotational and/or a pivoting movement of the webbing guide. A safety harness assembly incorporating the described webbing guide is provided also.

23 Claims, 4 Drawing Sheets

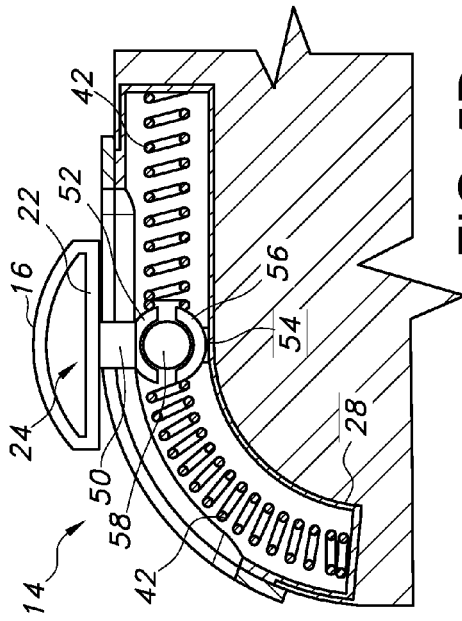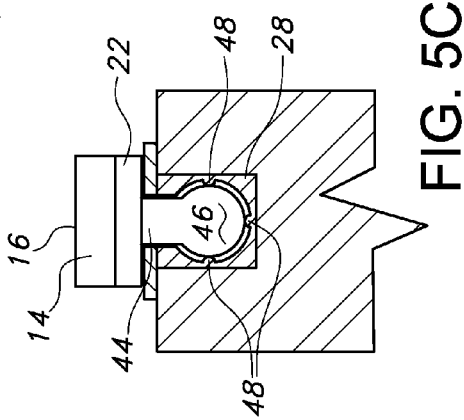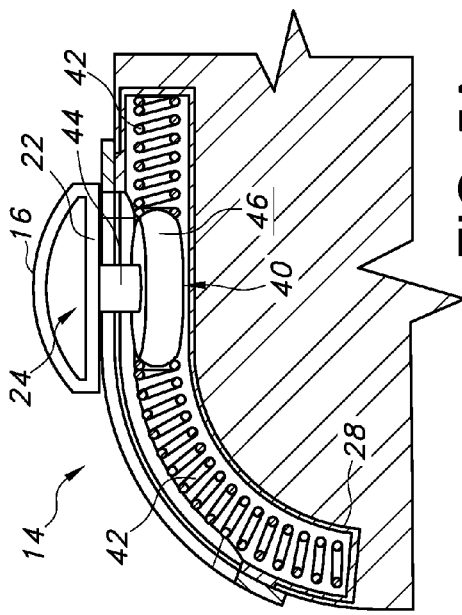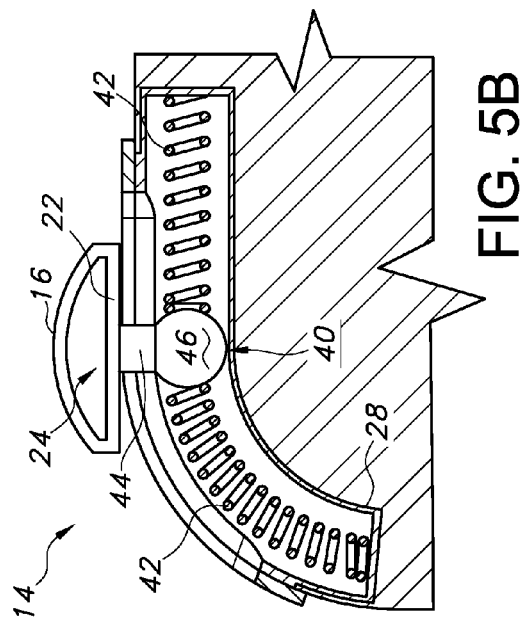

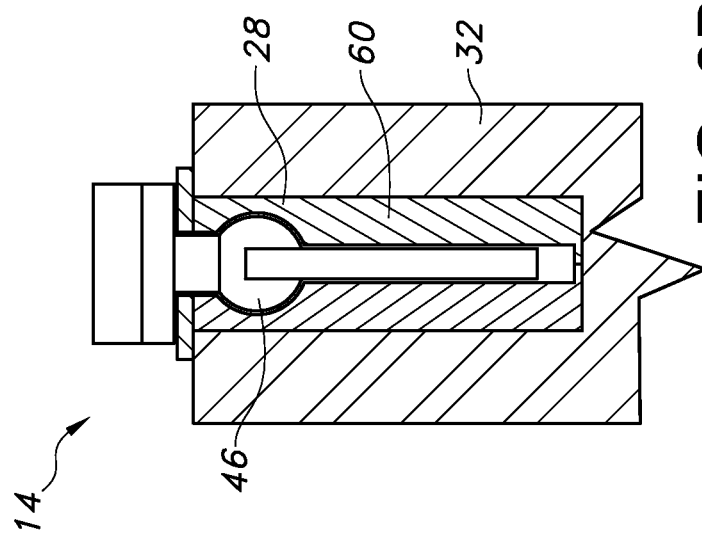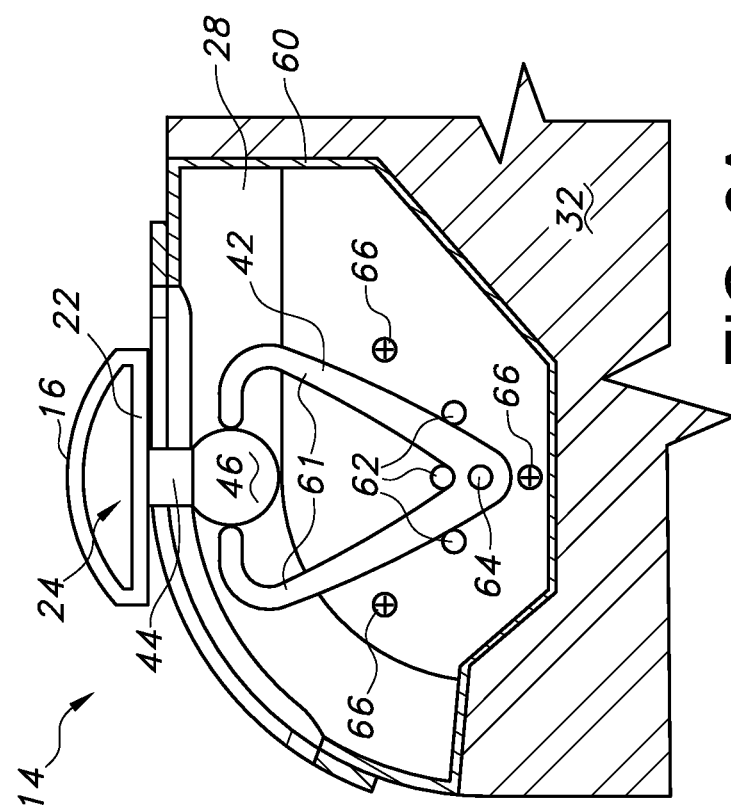

INTEGRATED SLIDE ADJUSTABLE PIVOTING SEAT BELT WEBBING GUIDE

TECHNICAL FIELD

This disclosure relates generally to seat belts. In particular, the disclosure relates to an adjustable seat belt webbing guide which slides laterally relative to a seat back, and which also pivots on various planes of rotation.

BACKGROUND

In a collision, a vehicle experiences a sudden stop or at least a drastic reduction in momentum. However, passengers in the vehicle, if unrestrained, continue moving at the same speed at which the vehicle was previously moving, potentially striking elements of the vehicle interior such as the dash, steering wheel, etc. with devastating force. Still more, an unrestrained vehicle occupant may be ejected from the vehicle during a collision, further increasing the likelihood of traumatic injury or death. Therefore, safety considerations and legislation require most vehicles to be equipped with seat belts or safety belts. A seat belt, by applying an opposite force (to the force of the collision) to the occupant, reduces likelihood of death or serious injury in a collision by reducing the force of secondary impacts associated with ejection from the vehicle or contact with elements of the vehicle interior.

Modern vehicles are typically equipped with three-point seat belt harnesses, which as is known are Y-shaped straps including a lap belt portion and a sash or shoulder harness belt portion. These types of harness restrain the vehicle occupant at the hip and also at the shoulder and chest, thus dissipating the energy of the moving occupant's body over the chest, pelvis, and shoulders. The seat belt straps or webbing are typically manufactured of a highly durable fabric or blend of fabrics. For example, the webbing may be woven from thousands of polyester strands. The webbing may further be designed to elongate by a predetermined percentage of the strap length during a collision (for example, approximately 10% to 15%) to assist in absorbing the energy of the collision and so further protect the vehicle occupant.

Three-point seat belts are typically anchored to the vehicle or to a seat of the vehicle at a first point substantially adjacent to a shoulder of the seat occupant and at a second point adjacent to a hip of the seat occupant. A third point of anchorage is provided by the seat belt buckle assembly, typically being a buckle element secured to the vehicle or to the vehicle seat and a cooperating tongue element which is manually latched to the buckle by the vehicle occupant. It is also known to provide seat belt harnesses which automatically latch to restrain the vehicle occupant when the vehicle occupant sits in the seat and closes the vehicle door.

Of course, other types of seat belt harnesses are known in the art, including four-, five-, six-, and seven-point harnesses. The skilled artisan will appreciate by reading the present disclosure that the adjustable seat belt webbing guide described herein can readily be adapted to these types of harness.

Other features typically found in seat belt harnesses include locking retractors, which allow some free movement of the vehicle occupant's upper torso but which limit this movement during severe deceleration, such as during a collision. Other common features include sensor-triggered pretensioners, which preemptively tighten the seat belt in the event of a collision and/or rapid acceleration and deceleration of the vehicle, and web clamps, which clamp the seat belt webbing in the event of sudden deceleration to limit the distance the webbing can spool out. Reminder chimes/lights are typically provided to remind the vehicle occupant to latch the seat belt harness. A web guide may be provided, to ensure that the seat belt web (particularly the shoulder harness portion) contacts the vehicle occupant at a desired position and also to provide a point along which the seat belt travels as the occupant adjusts the length and positioning thereof.

The vehicle seat and seat belt harnesses are typically the same size regardless of the vehicle. However, the seat belt harnesses will be used by a wide variety of vehicle occupants having divergent heights, weights, etc. Even with occupants having the same height, as an example, one occupant of a certain height may have a different torso length compared to another occupant of the same exact height. A seat belt harness of a vehicle may be perfectly comfortable for a first occupant, but may rub and chafe the neck of a next occupant. Thus, issues of comfort and safety arise, requiring additional mechanisms for adjusting a position of some or all of the seat belt harness.

To solve these and other problems, the present disclosure relates to an adjustable seat belt webbing guide allowing adjustment of the seat belt harness laterally relative to a vehicle seat back. The described adjustable seat belt webbing guide also allows pivoting/rotation of the seat belt webbing along one or more planes of rotation. In combination, these features allow adjustment of the seat belt harness to contact the seat occupant at different angles and so to increase comfort and convenience.

SUMMARY

In accordance with the purposes and benefits described herein, in one aspect a seat belt guide assembly for a vehicle is provided, including a webbing guide defining a slot for slidably receiving a seat belt web, a pivot mounted to the webbing guide, and a track configured to slidably receive the pivot and provide a path of travel for the webbing guide. The webbing guide includes a bottom and a cover which together define the slot. In embodiments, the cover is hingedly connected to the bottom at a first end and includes a releasable closure disposed at an opposed end to allow removing the seat belt web, and to allow access to an interior of the assembly. The track may include at least one interior boss for slidably supporting the pivot along a length of the track.

The pivot may be defined by a stem attached to the webbing guide and a head attached to the stem. In one embodiment, the head is a disk allowing a rotational movement of the webbing guide in a single plane of rotation. In another embodiment, the head is a ball allowing a pivoting movement of the webbing guide in a plurality of planes of rotation. In still yet another embodiment, the pivot may be defined by a web guide-mounted arm ending in a first socket, a track-mounted interior sliding arm ending in a second socket, and a ball received in the first and second sockets. A resilient member may be included within the track to bias the pivot along the track. In embodiments, the resilient member may be at least one coiled spring, a v-spring, and others.

In another aspect, a safety harness assembly for a vehicle is provided, including a vehicle seat and a seat belt web defining a three-point seat belt harness. The harness assembly further includes a webbing guide defining a slot for slidably receiving a portion of the seat belt web, a pivot mounted to the webbing guide, and a seat-mounted track configured to slidably receive the pivot and provide a path of travel for the webbing guide. These elements are substantially as described above.

The track is disposed substantially within the seat to provide a lateral path of movement of the pivot relative to an axis of the seat.

In the following description, there are shown and described embodiments of the disclosed adjustable seat belt webbing guide. As it should be realized, the structure is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed adjustable seat belt webbing guide, and together with the description serve to explain certain principles thereof. In the drawings:

FIG. 5A is a section view of an embodiment of a seat belt webbing guide pivot according to the present disclosure;

FIG. 5B is a section view of an alternative embodiment of a seat belt webbing guide pivot according to the present disclosure;

FIG. 5C is a section view of another alternative embodiment of a seat belt webbing guide pivot according to the present disclosure;

FIG. 5D is an axial section view of an embodiment of a seat belt webbing guide track according to the present disclosure;

FIG. 6A is a front view of an embodiment of a seat belt webbing guide track resilient member; and FIG. 6B is a side view of the seat belt webbing guide track resilient member of FIG. 6A.

Reference will now be made in detail to embodiments of the disclosed adjustable seat belt webbing guide, examples of which are illustrated in the accompanying drawing figures.

DETAILED DESCRIPTION

Figure 1:
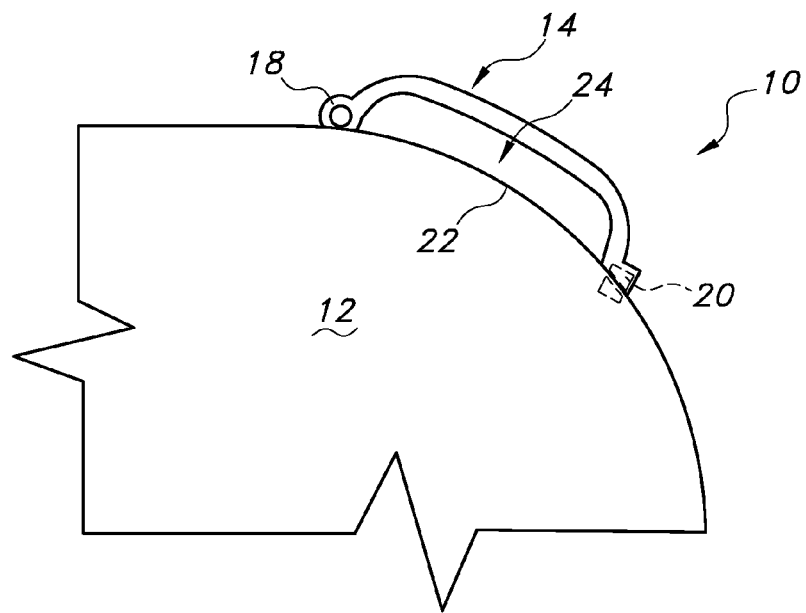
FIG. 1 shows a front view of a seat-mounted seat belt webbing guide according to the present disclosure.

With reference to FIG. 1, to address the above-discussed issues the present disclosure relates to a vehicle seat belt guide assembly 10 disposed on a surface of a vehicle seat 12. The assembly 10 will typically be disposed on and partially within a surface of the seat 12, providing a lateral path of movement for the seat belt guide assembly 10 as will be described. In the depicted embodiment, the seat belt guide assembly 10 includes a webbing guide 14 including a cover 16 having at least one hinge 18 at a first end and a closure at an opposed end. In embodiments, the closure is a magnetic snap closure comprising at least one male or female magnet 20 attached to or intermolded in the material of the cover 16, and a corresponding female or male magnet or a metal disk (not shown) intermolded in or attached to the material of a webbing guide bottom 22. Of course, alternative closures are possible and contemplated for use herein.

Figure 2:
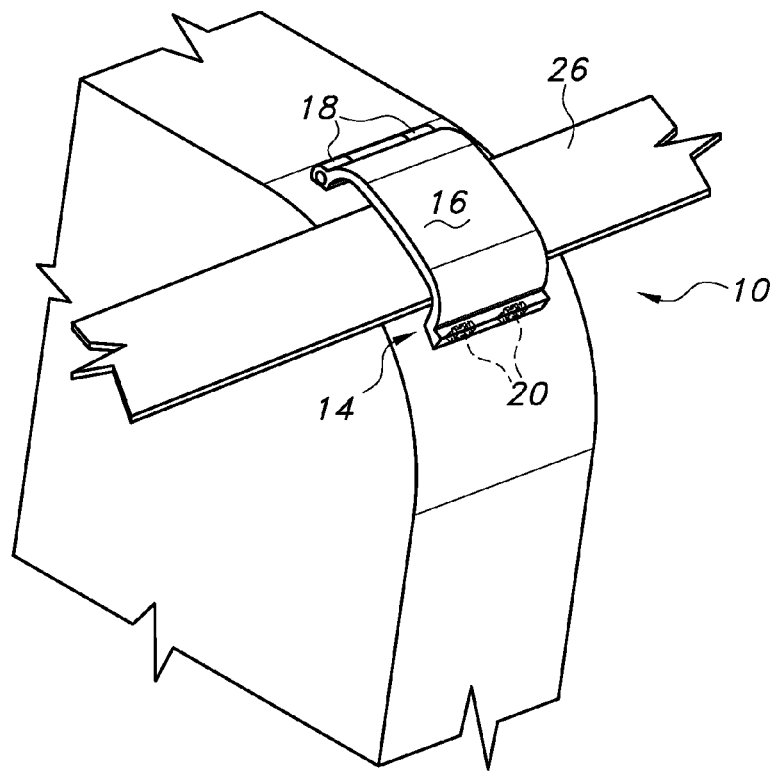
FIG. 2 shows an isometric view of the guide of FIG. 1.

The cover 16 is hingedly attached to a bottom 22, and in combination the cover 16 and bottom 22 define a slot 24 through which a seat belt web 26 (see FIG. 2) is slidably received. As will be appreciated, this feature of a hinged cover 16 facilitates removal of the seat belt web 26 from the guide assembly as needed, for example when the user desires to fold the seat back down. The embodiments shown in the drawing figures depict a traditional barrel-type hinge structure, including a barrel, knuckles, and a hinge pin. However, the skilled artisan will appreciate that any suitable hinge structure is contemplated, including without intending any limitation a living hinge, a spring hinge, a torque hinge, a friction hinge, a concealed hinge, a flag hinge, and others.

Figure 3:
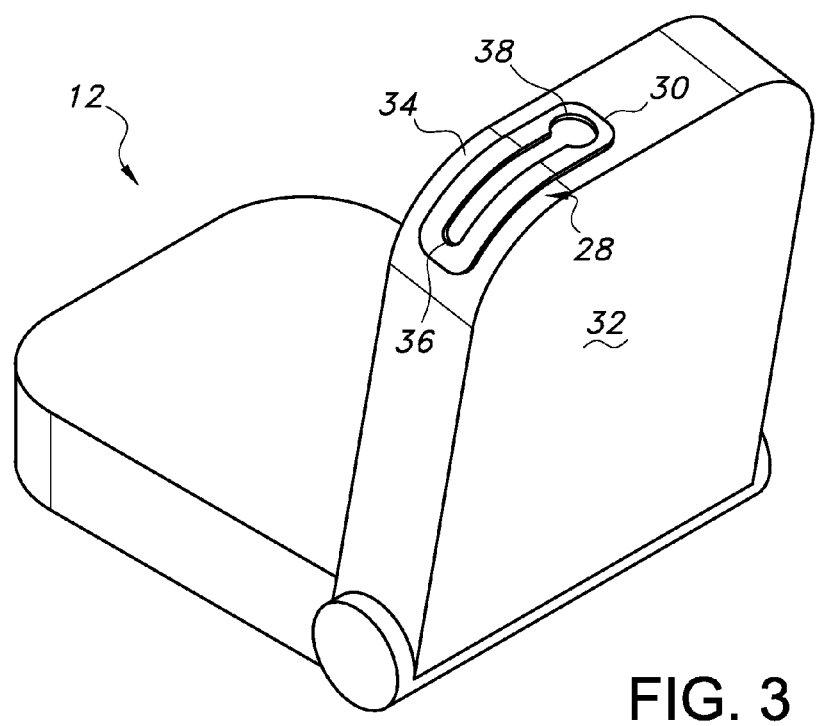
FIG. 3 shows a rear perspective view of a vehicle seat including a track for a seat belt webbing guide according to the present disclosure.
Figure 4:
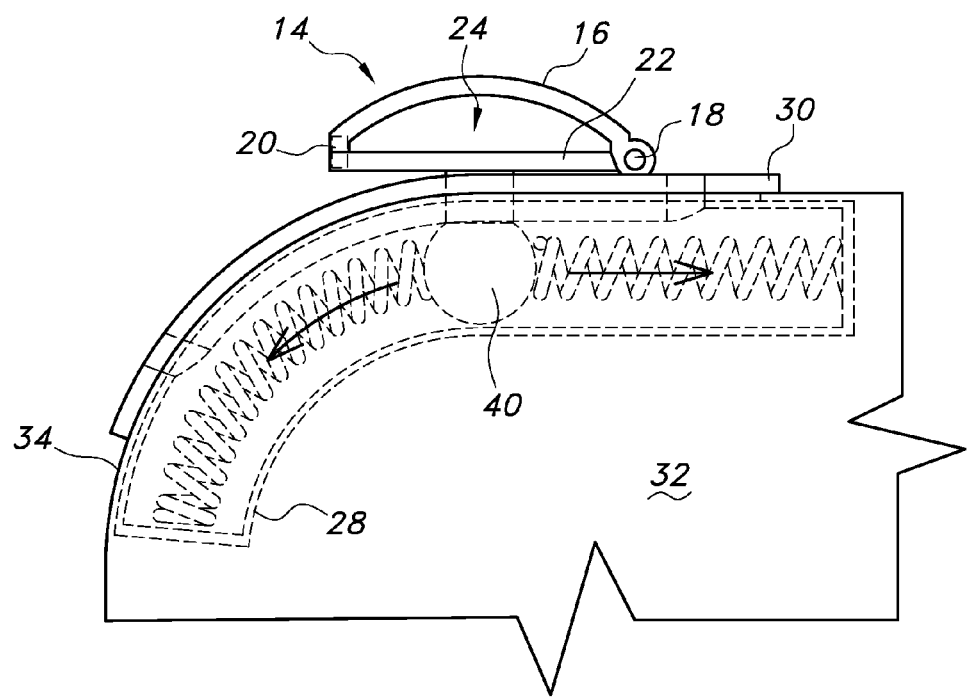
FIG. 4 shows a section view of the guide of FIG. 1.

By mechanisms which will be described in greater detail below, as shown in FIG. 3 the webbing guide 14 laterally slides within a track 28 disposed on seat 12, most typically on a portion of seat back 32. Track 28 may include an exterior bezel 30 disposed substantially flush with a surface of the seat back 32, conventionally at a top corner 34 of the seat 12 back to receive the shoulder harness portion of a three-point seat belt harness. In one embodiment, bezel 30 defines a slit 36. The remainder of the structure of the track 28 is disposed in an interior of the seat back 32 as shown in FIG. 4. In the depicted embodiment, track 28 is disposed within seat back 32, and is arranged to provide a lateral movement (relative to a longitudinal axis defined by a vehicle carrying seat 12) for webbing guide 14. Webbing guide 14 is slidingly carried within track 28 along that lateral range of movement by a pivot 40. At least one resilient member 42 may be included to bias pivot 40 in a desired direction in track 28.

As will be described, by these features the seat belt guide assembly 10 is provided with a lateral, rotational, and pivoting range of motion, but yet defines a slim profile which aesthetically blends with the seat 12, rather than a bulky and obtrusive mechanism. In turn, webbing guide 14 may be removed from bezel 30/track 28 by removing pivot 40 through an enlarged end 38 of slit 36, allowing access for maintenance, repair, etc.

A number of embodiments for pivot 40 are contemplated. Of course, pivot 40 may simply be defined by a stalk which slides along an interior surface of track 28. However, in particular embodiments (see FIGS. 5A-5D), pivot 40 may be defined by a neck 44 terminating in a head 46, wherein head 46 is configured to more easily slide along the interior surface of track 28. Neck 44 is received in and through slit 36 of bezel 30, providing further support for the mechanism while still allowing lateral movement. Resilient members 42, in the depicted embodiment being coiled springs, bias head 46 centrally within track 28. Thus, whenever the user is not applying an adjusting force to webbing guide 14 to avoid neck chafing or other discomfort, resilient member 42 bias head 46 and so webbing guide 14 back to a central position within track 28.

In the embodiment of FIG. 5A, head 44 is a disk. As will be appreciated, in addition to the lateral range of motion for webbing guide 14 provided by track 28, this structure allows rotational movement of webbing guide 14 along a single plane of rotation. Thus, the mechanism allows lateral and rotational adjustment of webbing guide 14, and thereby lateral and rotational adjustment of a seat belt web 26 carried thereby to improve user comfort and convenience.

In an alternative embodiment, a pivoting movement is also provided for webbing guide 14. In one such embodiment (see FIG. 5B), head 46 is a ball received within track 28. Again, resilient members 42 bias head 46 to a central location within track 28. As will be appreciated, in addition to the lateral and rotational movements described above, configuring head 46 as a ball allows a pivoting movement along multiple planes of rotation for head 46, and so for webbing guide 14. This allows additional degrees of adjustment of webbing guide 14, still further improving user comfort and convenience. Head 46 may simply slide within track 28. In an alternative embodiment (see FIG. 5C), one or more bosses 48 may be provided within track 28, to automatically center head 46 in track 28.

In yet another embodiment, a pivoting webbing guide 14 may include an arm 50 mounted to webbing guide 14, with arm 50 terminating in a first socket 52. A cooperating sliding arm 54 terminating in a cooperating socket 56 is included. Cooperating sliding arm 54 is translatable along a length of a second track (not shown) disposed coaxially to track 28, which provides the entirety of the mechanism a lateral sliding movement. A pivot ball 58 is received in socket 52 and also socket 56, and so in addition to the lateral sliding movement, webbing guide 14 is provided a pivoting range of motion using pivot ball 58 as a pivot point.

The above-described embodiments use coiled springs as resilient members 42. In an alternative embodiment (see FIGS. 6A-6B), resilient member 42 is a v-spring of known configuration, including arms 61 disposed to hold head 46 in a pincer-like manner. With reference to FIG. 6A, a housing 60 disposed within seat back defines track 28 (see FIG. 6B) and also defines a holder for resilient member 42. Pins 62 extending from housing 60 hold resilient member 42 in place at a pivot point 64. Fasteners 66 secure halves of housing 60 one to another, but also provide a secondary pivot point for resilient member 42, to create a tighter radius of lateral motion conforming to the shape of the seat back 32. Arms 61 thus apply a centering biasing force to head 46 when a user is not biasing webbing guide 14 in an opposed direction.

As will be appreciated by the skilled artisan, suitable lubricants may be applied to ensure smooth sliding of head 46 relative to track 28. Alternatively, one or both of head 46 and an interior surface of track 28 may be fabricated of a naturally lubricious material. Any such lubricious material, lubricant, and combinations thereof are contemplated for use herein.

The skilled artisan will appreciate that by the above-described structures, a webbing guide mechanism for receiving a seat belt web is provided which allows a lateral, rotational, and pivoting range of motion for the webbing guide and seat belt web, to improve adjustability and so user comfort. The described mechanisms are simple, robust, and easily serviced or repaired. Still more, by reducing the complexity of mechanisms for providing the described range of motion for the webbing guide, a low-profile mechanism is provided which blends with the vehicle seat, and which is aesthetically pleasing to the user.

Obvious modifications and variations are possible in light of the above teachings. All such modifications and variations are within the scope of the appended claims when interpreted in accordance with the breadth to which they are fairly, legally and equitably entitled.

What is claimed:

1. A seat belt guide assembly for a vehicle, comprising:
    a webbing guide defining a slot for slidably receiving a seat belt web;
    a pivot mounted to the webbing guide; and
    a track configured to slidably receive the pivot and provide a path of travel for the webbing guide; and
    a resilient member disposed within the track for biasing the pivot.

2. The assembly of claim 1, wherein the webbing guide includes a bottom and a cover together defining the slot, the cover being hingedly connected to the bottom at a first end and having a releasable closure disposed at an opposed end.

3. The assembly of claim 2, wherein the closure is magnetic.

4. The assembly of claim 1, wherein the pivot is defined by a stem attached to the webbing guide and a head attached to the stem.

5. The assembly of claim 4, wherein the head is a disk allowing a rotational movement of the webbing guide in a single plane of rotation.

6. The assembly of claim 4, wherein the head is a ball allowing a pivoting movement of the webbing guide in a plurality of planes of rotation.

7. The assembly of claim 4, including at least one interior boss for slidably supporting the head along a length of the track.

8. The assembly of claim 1, wherein the pivot is defined by:
    a web guide-mounted arm ending in a first socket;
    a track-mounted interior sliding arm ending in a second socket; and
    a ball received in the first and second sockets.

9. The assembly of claim 1, wherein the resilient member is at least one coiled spring.

10. The assembly of claim 1, wherein the resilient member is a v-spring.

11. A vehicle seat including the assembly of claim 1.

12. A vehicle including the seat of claim 11.

13. A safety harness assembly for a vehicle, comprising:
    a vehicle seat;
    a seat belt web defining a three-point seat belt harness;
    a webbing guide defining a slot for slidably receiving a portion of the seat belt web;
    a pivot mounted to the webbing guide;
    a seat-mounted track configured to slidably receive the pivot and provide a path of travel for the webbing guide; and
    a resilient member disposed within the track for biasing the pivot.

14. The assembly of claim 13, wherein the webbing guide includes a bottom and a cover together defining the slot, the cover being hingedly connected to the bottom at a first end and having a releasable closure disposed at an opposed end.

15. The assembly of claim 14, wherein the closure is magnetic.

16. The assembly of claim 13, wherein the pivot is defined by a stem attached to the webbing guide and a head attached to the stem.

17. The assembly of claim 16, wherein the head is a disk allowing a rotational movement of the webbing guide in a single plane of rotation.

18. The assembly of claim 16, wherein the head is a ball allowing a pivoting movement of the webbing guide in a plurality of planes of rotation.

19. The assembly of claim 16, including at least one interior boss for slidably supporting the head along a length of the track.

20. The assembly of claim 13, wherein the pivot is defined by:
    a web guide-mounted arm ending in a first socket;
    a track-mounted interior sliding arm ending in a second socket; and
    a ball received in the first and second sockets.

21. The assembly of claim 13, wherein the resilient member is at least one coiled spring.

22. The assembly of claim 13, wherein the resilient member is a v-spring.

23. A vehicle including the assembly of claim 13.

* * * * *